(12) United States Patent
Becker et al.

(10) Patent No.: US 7,357,455 B2
(45) Date of Patent: Apr. 15, 2008

(54) HINGE MOUNTING FOR MOTOR VEHICLE SEATS AND HAVING A ROUND MEMBER

(75) Inventors: Burkhard Becker, Solingen (DE); Jörg Max Wölfel, Remscheld (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 0 days.

(21) Appl. No.: 11/376,045

(22) Filed: Mar. 15, 2006

(65) Prior Publication Data

US 2006/0250012 A1   Nov. 9, 2006

(30) Foreign Application Priority Data

Mar. 15, 2005 (DE) .................. 10 2005 012 182
Oct. 20, 2005 (DE) .................. 10 2005 050 222

(51) Int. Cl.
*B60N 2/02* (2006.01)

(52) U.S. Cl. ............................... 297/378.12
(58) Field of Classification Search ........... 297/378.12
See application file for complete search history.

(56) References Cited

U.S. PATENT DOCUMENTS

| 4,634,181 A * | 1/1987 | Pipon ............... 297/362 |
| 5,507,560 A * | 4/1996 | Frusti et al. ....... 297/354.12 |
| 5,984,413 A * | 11/1999 | Baloche et al. ..... 297/367 |
| 6,082,821 A * | 7/2000 | Baloche et al. ..... 297/354.12 |
| 6,149,235 A * | 11/2000 | Fahim .............. 297/259.2 |
| 6,799,801 B2 * | 10/2004 | Niimi et al. ....... 297/378.12 |
| 7,014,265 B2 * | 3/2006 | Yamada et al. ..... 297/367 |
| 2005/0212340 A1 * | 9/2005 | Fast ................ 297/378.12 |

FOREIGN PATENT DOCUMENTS

| DE | 197 57 110 C1 | 12/1997 |
| DE | 197 57 111 C1 | 12/1997 |
| DE | 20 2004 010 645 U1 | 10/2004 |
| EP | 0 770 514 B1 | 10/1996 |
| EP | 0 844 133 B1 | 9/1997 |

* cited by examiner

*Primary Examiner*—Sarah B. McPartlin
(74) *Attorney, Agent, or Firm*—McCarter & English, LLP

(57) ABSTRACT

A hinge mounting for a seat back of a motor vehicle seat that is particularly suited for a motor vehicle seat having but one door on either side of the vehicle and has a first hinge arm, a second hinge arm and a round member that is interposed between the first hinge arm and the second hinge arm. The round member including (a) a first round plate connected to the first hinge arm, (b) a second round plate associated with the second hinge arm, (c) a clamp forming a partial grip around the rim of the two round plates to hold them together and (d) a stop device located between the two round plates. The two hinge arms are adapted for relative rotation about a hinge pin. The clamp has a cutout. The second round plate includes at least one retainer face located in the region of the cutout. A releasable retainer device matching the retainer face, cooperating therewith and optionally blocking same is provided on the second hinge arm.

9 Claims, 6 Drawing Sheets

HINGE MOUNTING FOR MOTOR VEHICLE SEATS AND HAVING A ROUND MEMBER

CROSS-REFERENCE TO RELATED APPLICATIONS

This application claims priority to German Application No. DE 10 2005 012 182.9, filed Mar. 15, 2005, and German Application No. DE 10 2005 050 222.9, filed Oct. 20, 2005, the contents of which are expressly incorporated by reference in their entirety as part of the present disclosure.

BACKGROUND

The invention relates to a hinge mounting for a seat back hinge of a motor vehicle seat having a first hinge arm, a second hinge arm and a round member that is interposed between the first hinge arm and the second hinge arm, the round member comprising (a) a first round plate connected to the first hinge arm, (b) a second round plate associated with the second hinge arm, (c) a clamp forming a partial grip around the rim of the two round plates to hold them together and (d) a stop device located between the two round plates, the two hinge arms being adapted for relative rotation about a hinge pin.

Such a hinge mounting is known from the document DE 20 2004 010 645 U1. In principle, such type hinge mountings have proved efficient. However, the mounting is not advantageous for use in motor vehicles having but one door one either side of the vehicle and also comprise rear seats because an intermediate plate must be interposed between the second round plate and the second hinge arm in order to allow fast folding of the seat back as it is usual for facilitating access to the rear seats. Such type forwardly movable vehicle seats are known from the documents EP 0 844 133 B1, U.S. Pat. No. 5,893,610, DE 107 597 111 C1 and DE 197571110 C1 for example.

On the prior art motor vehicle seats, forward movement of the seat is enabled by pivoting the seat back forward after having actuated a corresponding disengagement lever provided thereon. This pivot movement allows catch devices of the longitudinal guide of the vehicle seat to come free. As a result, the vehicle seat can be moved forward in the longitudinal guide. Usually, a memory unit that permits to find back to the initial starting position is also provided.

SUMMARY OF THE INVENTION

It is the object of the invention to develop the hinge mounting of the type mentioned herein above in such a manner that it is better suited for two-door vehicles in particular. It aims at making it possible to quickly fold the back seat forward using therefor the least possible number of additional component parts.

The object is solved, in one aspect, by a hinge mounting for a seat back of a motor vehicle seat comprising a first hinge arm, a second hinge arm, and a round member that is interposed between the first hinge arm and the second hinge arm. The round member comprises: (a) a first round plate connected to the first hinge arm, (b) a second round plate associated with the second hinge arm, (c) a clamp forming a partial grip around a rim of the two round plates to hold them together, and (d) a stop device located between the two round plates, the two hinge arms being adapted for relative rotation about a hinge pin. Further, the clamp comprises a cutout, the second round plate comprises at least one retainer face located in a region of the cutout, and a releasable retainer device matching the retainer face, cooperating therewith and optionally blocking same is provided on the second hinge arm. The at least one retainer face is a portion of a retainer lug that is provided on the second round plate and projects radially outward through the cutout.

In another aspect, the object is solved by providing a hinge mounting for a seat back of a motor vehicle seat, more specifically for a motor vehicle seat of a motor vehicle having but two passenger doors, the hinge mounting comprising a first hinge arm, a second hinge arm, and a round member that is interposed between the first hinge arm and the second hinge arm. The round member comprises: (a) a first round plate connected to the first hinge arm, (b) a second round plate associated with the second hinge arm, (c) a clamp forming a partial grip around a rim of the two round plates to hold them together, and (d) a stop device located between the two round plates, the two hinge arms being adapted for relative rotation about a hinge pin. Further, the clamp comprises a cutout, the second round plate comprises at least one retainer face located in a region of the cutout, and a releasable retainer device matching the retainer face, cooperating therewith and optionally blocking same is provided on the second hinge arm and on the outside of the cutout. The at least one retainer face is a portion of a retainer bight that is provided on the second round plate and projects radially inward within the cutout and makes radial coupling from the outside through the cutout onto the second plate possible.

On the hinge mounting of the invention, the second hinge arm can be connected optionally to the second round plate by providing the second round plate with at least one retainer face that is accessible through the cutout in the clamp and by providing the releasable retainer device on the second hinge arm. This releasable retainer device cooperates with the retainer face and allows blocking in at least one direction of rotation about the hinge pin, with this blocking preferably being provided in the two directions of rotation. The cutout makes radial coupling from the outside onto the second round plate possible whenever this is wanted.

In the normal position of utilization of the seat back of the motor vehicle seat, the releasable retainer device engages with the at least one retainer face. It is only moved out of engagement if quick forward folding of the seat back is wanted. Thanks to the cutouts, the releasable retainer device can be provided radially outside of the two round plates. Put another way, the releasable retainer device is preferably located outside of the periphery of the clamp. The advantage thereof is that the hinge mounting remains short in the axial direction. With few additional component parts, the prior art hinge mounting is developed so that it is particularly suited for two-door motor vehicles.

It is preferred that the retainer face be either a portion of a retainer lug provided on the second round plate and projecting outward, or that the retainer face be a portion of a retainer bight provided in the second round plate. The releasable retainer device is configured and provided in conformity therewith. The preferred solution is the one in which the retainer face is a portion of the retainer lug. In this case, the hinge mounting can be of a smaller and lighter construction.

In the preferred embodiment, the cutout in the clamp is configured to be a window. As a result, the mechanical function of the clamp is least affected. The clamp has to perform the task of holding the two round plates together in the axial direction. At the most, it can be connected to one round plate, by no means however to both.

Preferably, the first hinge arm is connected to an underframe and the second hinge arm is solidly connected to the seat back. Accordingly, the at least one retainer face remains stationary when the seat back is being folded forward. The retainer device, which is formed on the second hinge arm, pivots together with the seat back. It can be controlled by an actuation lever provided on the seat back.

The stop device is preferably configured to have stopper arms as they are known for example from EP 0770514 or it has an internally toothed gear in which an externally toothed gear wobbles eccentrically.

BRIEF DESCRIPTION OF THE DRAWINGS

Other features and advantages will become more apparent upon reviewing the appended claims and the following non restrictive description of embodiments of the invention, given by way of example only with reference to the drawing. In the drawing:

DETAILED DESCRIPTION OF THE INVENTION

Figure 1:
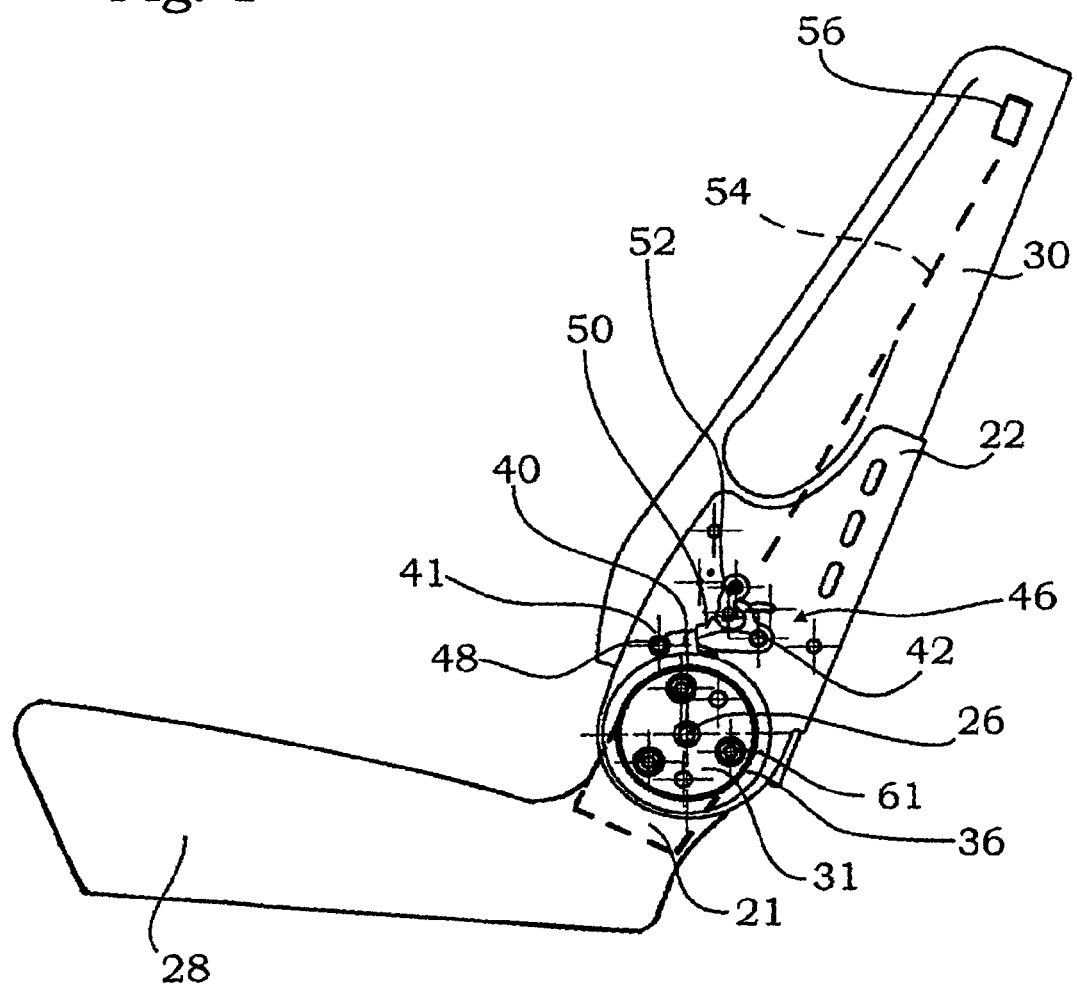
FIG. 1: shows a schematic side view of a motor vehicle seat, with the seat being in the normal position of utilization.

The embodiment shown in the FIGS. 1 through 5 refers to a first exemplary embodiment. FIG. 6 shows a second exemplary embodiment only showing one round member. Herein after, mainly the first exemplary embodiment will be discussed at first.

The FIGS. show a seat back hinge mounting of a motor vehicle seat; it has a first hinge arm 21, a second hinge arm 22 and a round member 24 interposed between these two hinge arms 21, 22. The seat back hinge has a hinge pin 26 about which the two hinge arms 21, 22 are relatively pivotable. The first hinge arm 21 is connected to an underframe 28 of the vehicle seat, with the FIGS. 1 and 2 substantially showing a seat part of the underframe 28. The second hinge arm 22 is solidly connected to a seat back 30 of the motor vehicle seat. The round member 24, which can be seen from the FIGS. 5 and 6, has a first round plate 31 and a second round plate 32. Between these two, there is interposed a stop device for stopping the two round plates 31, 32 relative to each other but also for adjusting their relationship. This stop device is known per se and needs not be discussed in further detail.

A clamp 36 forms a partial grip around the rim of the two round plates 31, 32. This clamp 36 holds the two round plates 31, 32 together while also allowing them to rotate relative to one another.

Figure 5:
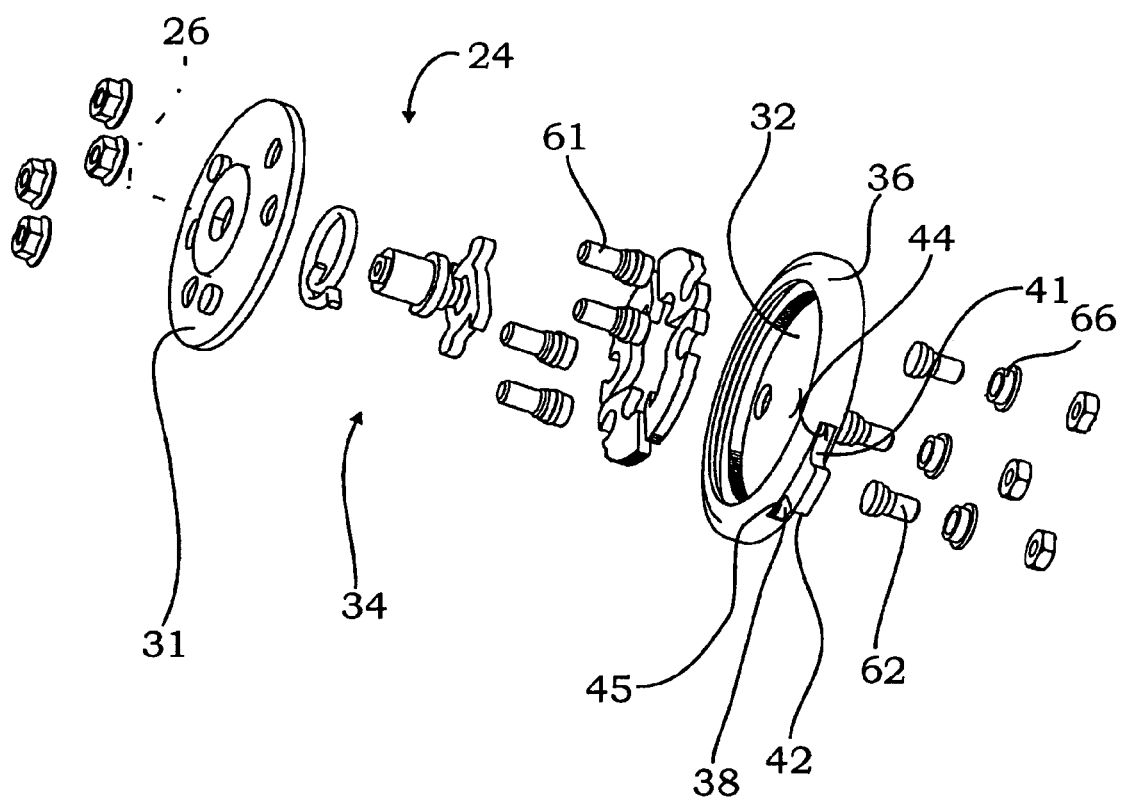
FIG. 5: is a perspective illustration of an assembly drawing of a round member with stopper arms.
Figure 6:
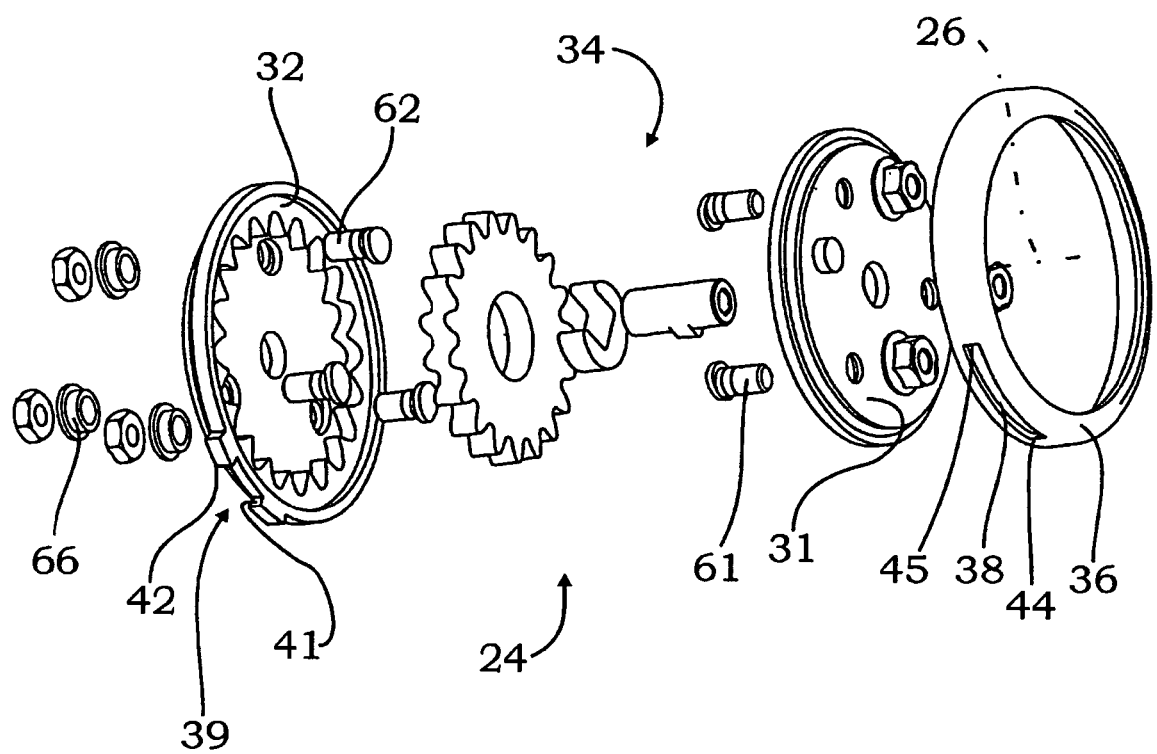
FIG. 6: is a perspective illustration of an assembly drawing of a round member with an internal ring gear and a cam gear.

As best shown in the FIGS. 5 and 6, this clamp 36 has a cutout 38 that is preferably configured to be a window and is illustrated as such in the two FIGS. This is not a limitation, though. Instead, the cutout 38 can also be any type of opening; for example, the clamp 36 configured in the shape of a partial ring may generally have an opening forming the cutout. In the exemplary embodiments, the cutout 38 is shown as a radial opening extending in the plane of the two round plates 31, 32 although it may also extend across the plane.

In the embodiment shown in FIG. 5, a retainer lug 40 projects from the second round plate 32. In the circumferential direction, the lug has two radially extending retainer faces 41, 42 which bound the retainer lug 40 in the circumferential direction. The angular spacing between these two retainer faces 41, 42 is matched to the angular spacing of the side rims 44, 45 bounding the cutout 38 in such a manner that the retainer lug 40 is allowed to pivot within the cutout 38 about the very angle the seat back needs to pivot from the normal position of utilization (FIG. 1) into the forward moved position (FIG. 2), although this is not compulsory. The cutout 38 may also be smaller or larger. The cutout may also be just the size of the retainer lug 40 and the clamp may move together with the retainer lug 40.

In the embodiment shown in FIG. 6, the second round plate 32 has a retainer bight that is bounded and defined by two confronting retainer faces 41, 42. It is a kinematic inversion of the retainer lug 40 shown in FIG. 5.

On the second hinge arm 22, there is configured a releasable retainer device 46 that will be discussed herein after. It cooperates with the retainer faces 41, 42.

Figure 2:
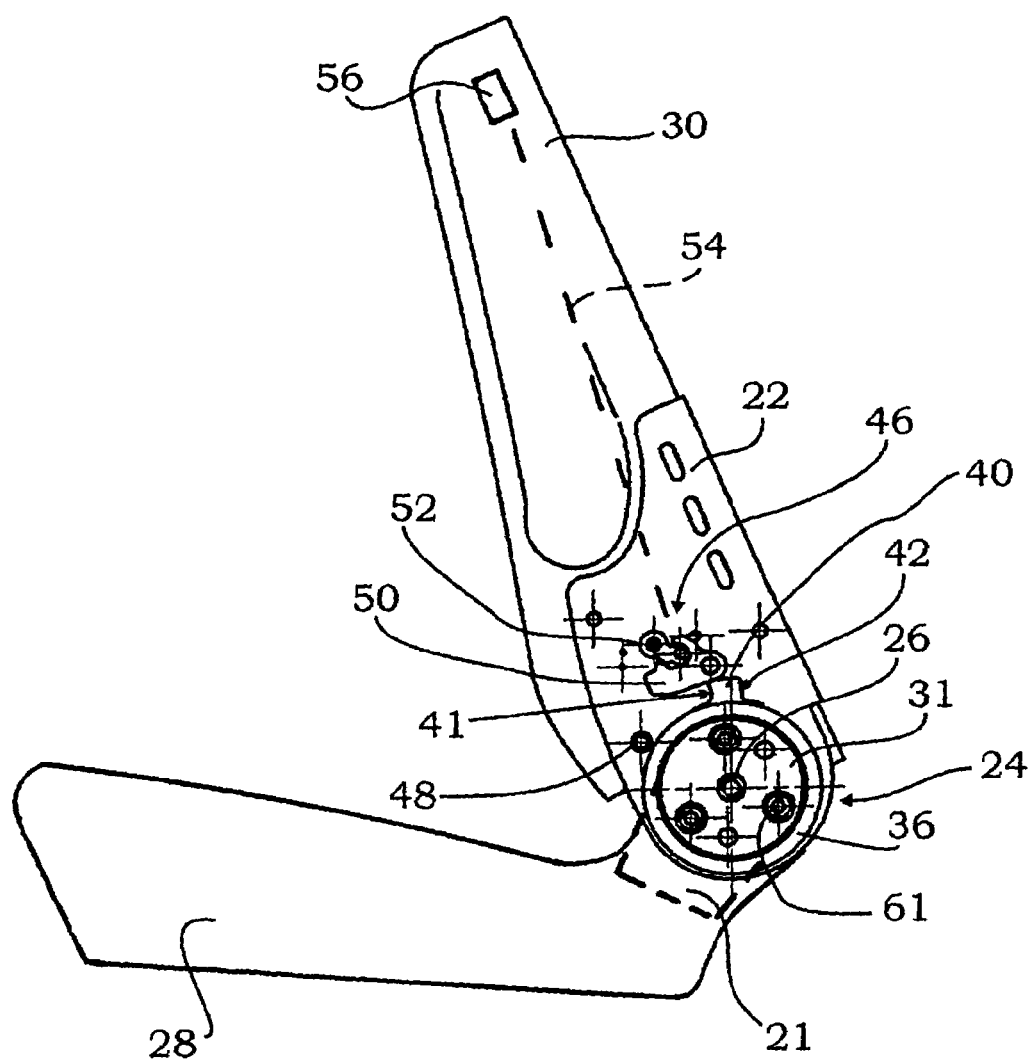
FIG. 2: shows an illustration like FIG. 1, with the seat back now being folded forward.

As shown in particular in the FIGS. 1 and 2, this retainer device 46 comprises a limit stop 48 that in this instance is configured in the form of a pin and is solidly connected to the second hinge arm 22. In the illustration shown in FIG. 1, it abuts the first retainer face 41. In the illustration shown in FIG. 2, it is spaced a clear distance apart from the retainer face 41, with the spacing also corresponding to the pivot angle of the seat back.

In the illustration shown in FIG. 1, the second retainer face 42 is in contact with a stopper arm 50 of the retainer device 46. It cooperates with a control arm 52 that is also pivotally disposed on the second hinge arm 22. It can be actuated by a Bowden cable 54 that communicates with a disengagement lever 56 and is provided in a known manner on the seat back 30. In the configuration shown in the FIGS. 3 and 4, the Bowden cable 54 does not directly act onto the control arm 52, an approximately triangular intermediate lever is provided instead.

Figure 3:
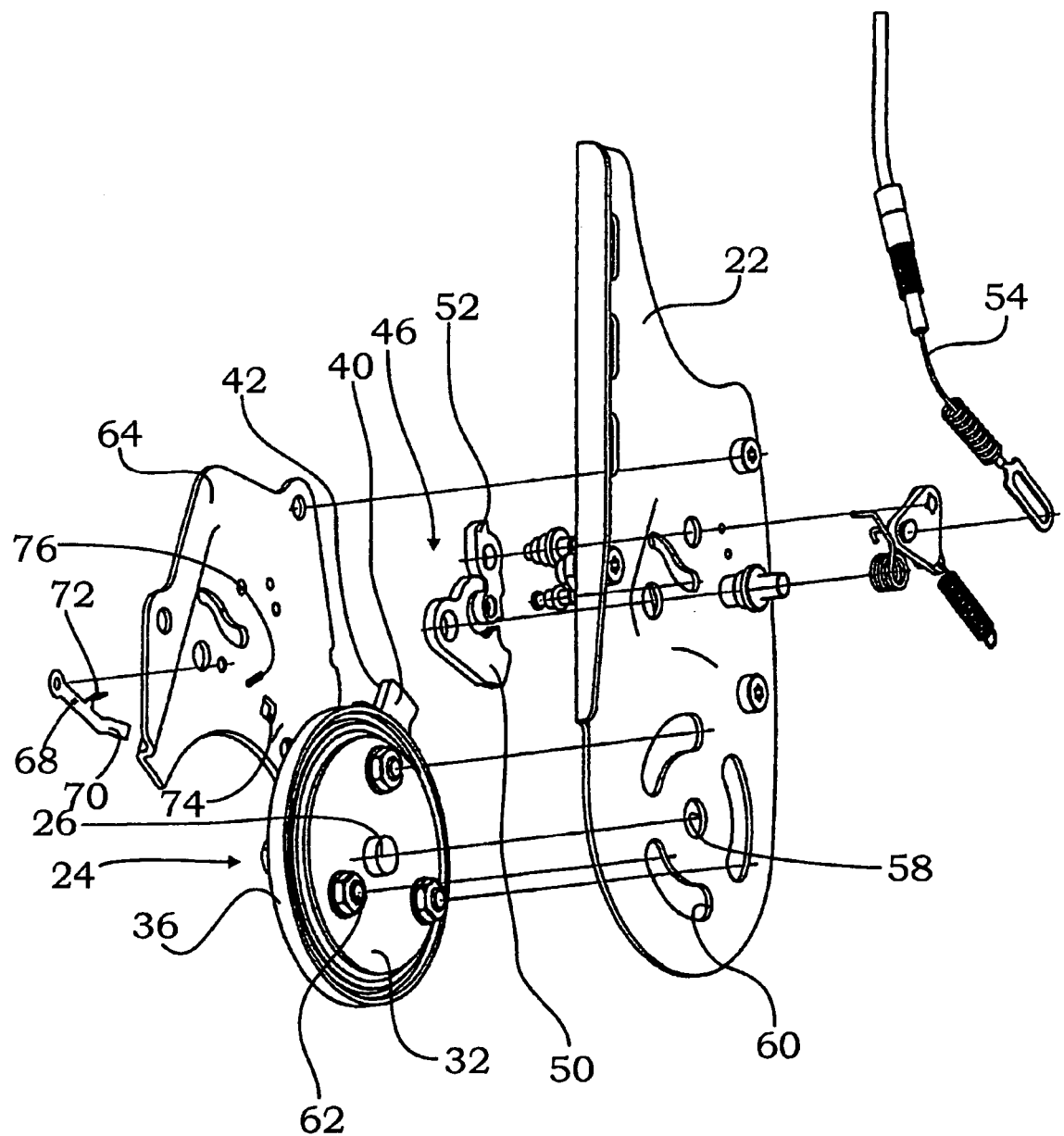
FIG. 3: shows a perspective illustration in the form of an assembly drawing of the hinge mounting, but without first hinge arm.
Figure 4:
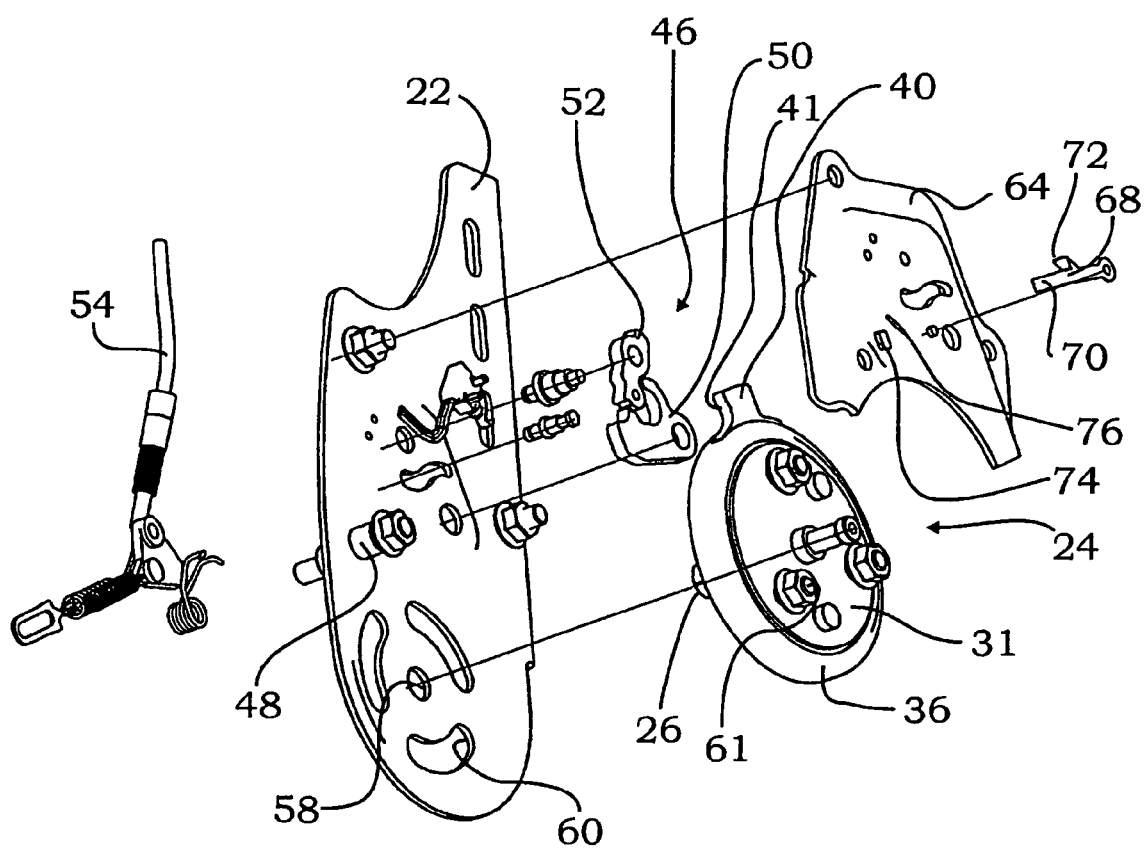
FIG. 4 is a perspective illustration of the arrangement of FIG. 3, but now viewed from the opposite direction.

As shown in the FIGS. 3 and 4, a hole 58 for receiving the hinge pin 26 is provided in the second hinge arm 22. Concentrically therewith, there are formed three long holes 60 through which spacer means 66 extend that are inserted via screw necks 62 projecting from the second round plate 32 and serving to fasten them. Nuts, which are located outside the long holes 60, are screwed onto these screw necks 62. Within the long holes 60, the screw necks 62 may pivot the angle desired for forward movement of the seat.

As further shown in the FIGS. 3 and 4, a plate 64 is associated with the second hinge arm 22, the plate carrying and receiving, just like the second hinge arm 22, the component parts of the retainer device 46 while simultaneously performing the function of a housing part surrounding and protecting the component parts of the retainer device 46.

In this plate 64 a retainer means 68 is carried so as to be pivotable about an axle pin. It is substantially configured to be a flat part made from sheet metal, preferably from spring steel. It is substantially Y-shaped, has a control arm 70 commencing radially at the axle pin and being bent twice at its free end region, and a retainer arm 72 formed on a branch of the Y and comprising a short angled portion at its free end. Through this angled portion, it comes into contact with the stopper arm 50. The control arm 70 engages through a window 74 in the plate 64 and the retainer arm 72, through an opening 76 in the plate.

This retainer means 68 ensures that, in the position shown in FIG. 2, the stopper arm 50, which is biased by a spring, is prevented from pivoting into the region between the first retainer face 41 and the limit stop 48. For, by doing so, it would block the seat back 30 and prevent it from pivoting back. The control arm 70 is controlled by the retainer lug 40. It is in contact with the control arm 70 when the seat is in the position shown in FIG. 1. If, starting from there, the seat back is pivoted forward into the position shown in FIG. 2, the control arm 70 comes free from the retainer lug 40. As a result, the retainer arm 72 is allowed to protrude from its opening 76 far enough to engage beneath the stopper arm 50 where it retains the stopper arm in the pulled position shown in FIG. 2. As a result, the stopper arm 50 cannot fall into the region that is located on the one side between the first retainer face 41 and the limit stop 48 and is defined on the other side by an arc of a circle about the hinge pin 26 having the radius of the free end of the retainer lug 40. As a result, the stopper arm 50 cannot get into a "forbidden region" into which it could otherwise pivot under the action of the spring bias to which it is subjected upon release of the release lever 56, that is, when it is no longer retained by the control arm 52 in the position shown in FIG. 2. This permits to counter misuse of the lever. The seat back is prevented from blocking in the position shown in FIG. 2.

The disclosure content of the patent application filed today "Seat Back Hinge Mounting for a Forwardly Foldable Motor Vehicle Seat" by the same applicant is fully incorporated herein by reference.

What is claimed is:

1. A hinge mounting for a seat back of a motor vehicle seat, the hinge mounting comprising:
   a first hinge arm;
   a second hinge arm; and
   a round member that is interposed between the first hinge arm and the second hinge arm, the round member comprising
   (a) a first round plate connected to the first hinge arm,
   (b) a second round plate associated with the second hinge arm,
   (c) a clamp forming a partial grip around a rim of the two round plates to hold them together, and
   (d) a stop device located between the two round plates, the two hinge arms being adapted for relative rotation about a hinge pin,
   wherein the clamp comprises a cutout, the second round plate comprises at least one retainer face located in a region of the cutout, and a releasable retainer device matching the retainer face, cooperating therewith and optionally blocking same is provided on the second hinge arm, and wherein the at least one retainer face is a portion of a retainer lug that is provided on the second round plate and projects radially outward through the cutout.

2. The hinge mounting as set forth in claim 1, wherein the second round plate comprises two retainer faces that are directed in generally opposing directions with respect to each other.

3. The hinge mounting as set forth in claim 1, wherein the cutout in the clamp is configured to be a window.

4. The hinge mounting as set forth in claim 1, wherein a hole carrying a hinge pin is formed in the second hinge arm.

5. The hinge mounting as set forth in claim 1, wherein at least one long hole running concentrically with the hinge pin is formed in the second hinge arm.

6. The hinge mounting as set forth in claim 1, wherein the cutout in the clamp extends in a circumferential direction over an angular range corresponding to an angle through which the seat back pivots when the seat back is being folded forward.

7. The hinge mounting as set forth in claim 1, wherein there is provided a retainer means that is disposed in proximity to a stopper arm and comprises a retainer arm which, in the forward folded position of the seat back, retains the stopper arm in a position in which the stopper arm has come free from the retainer lug.

8. The hinge mounting as set forth in claim 1, wherein the hinge mounting is for a motor vehicle seat of a motor vehicle having at least two passenger doors.

9. A hinge mounting for a seat back of a motor vehicle seat, more specifically for a motor vehicle seat of a motor vehicle having but two passenger doors, the hinge mounting comprising:
   a first hinge arm;
   a second hinge arm; and
   a round member that is interposed between the first hinge arm and the second hinge arm, the round member comprising
   (a) a first round plate connected to the first hinge arm,
   (b) a second round plate associated with the second hinge arm,
   (c) a clamp forming a partial grip around a rim of the two round plates to hold them together, and
   (d) a stop device located between the two round plates, the two hinge arms being adapted for relative rotation about a hinge pin,
   wherein the clamp comprises a cutout, the second round plate comprises at least one retainer face located in a region of the cutout, and a releasable retainer device matching the retainer face, cooperating therewith and optionally blocking same is provided on the second hinge arm and on an outside of the cutout, and wherein the at least one retainer face is a portion of a retainer bight that is provided on the second round plate and projects radially inward within the cutout and the releasable retainer device extends from the outside through the cutout and into engagement with the retainer bight to define a radial coupling.

* * * * *